3,314,938
METHOD OF PREPARING 2,6-DICHLOROPURINE AND 2,6-DICHLOROPURINE RIBOFURANOSYL
Hideaki Kawashima, 2-87 Nagaura-machi, Yokosuka-shi, Kanagawa-ken, Japan; Izumi Kumashiro, 647 Osone-cho, Kohoku-ku, Yokohama-shi, Kanagawa-ken, Japan; and Tadao Takenishi, 13 Tamagawa-Noge-cho, Setagaya-ku, Tokyo, Japan
No Drawing. Filed Nov. 30, 1964, Ser. No. 414,853
Claims priority, application Japan, Dec. 6, 1963, 38/65,643; May 25, 1964, 39/29,231
5 Claims. (Cl. 260—211.5)

The present invention relates to a method of preparing 2,6-dichloropurine and its derivatives.

2,6-dichloropurine and its derivatives are intermediates in the synthesis of purine nucleosides and purine nucleotides.

We have found that hypoxanthine 1-N-oxide and its derivatives, when reacted with phosphoryl chloride in the presence of an amine, are converted to 2,6-dichloropurine and the corresponding derivatives in very high yields.

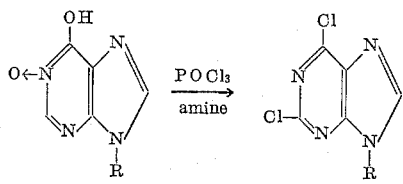

wherein R is H or a suitably substituted ribofuranosyl group.

Hypoxanthine 1-N-oxide, a starting material for the method of the present invention, may be prepared from 4-aminoimidazole-5-hydroxamic acid by cyclization with ethyl orthoformate (E. C. Taylor; J. Org. Chem. 24, 2019–2021 (1959)). Hypoxanthine 1-N-oxide may also be prepared from adenine 1-N-oxide by reaction with nitrite. Derivatives of hypoxanthine 1-N-oxide which are suitable starting materials are inosine 1-N-oxides in which are the hydroxyl groups in the 2',3', and 5' positions are substituted with lower acyl, benzoyl, or tosyl groups, or with an alkylidene group in positions 2',3' and a lower acyl, benzoyl, or tosyl group in position 5', the term "lower acyl" being used narrowly to designate the radical of a lower alkanoic acid. For example, adenosine 1-N-oxide is deaminated with nitrite to inosine 1-N-oxide, and the latter is converted with acetic anhydride in the presence of a base to 2',3',5'-tri-O-acetylinosine-1-N-oxide which may then be reacted with POCl₃.

The phosphoryl chloride is employed in amounts of more than 2 moles per mole of hypoxanthine oxide, and preferably in amounts of more than 5 moles per mole of hypoxanthine 1-N-oxide or derivative.

No amines have been found which would not be operative to some extent in our method. Amines which have been used successfully as catalysts in the present invention include primary amines, such as methylamine, ethylamine, propylamine, ethylenediamine, hexamethylenediamine, cyclohexylamine, aniline, toluidine, xylidine, and phenylenediamine; secondary amines, such as dimethylamine, diethylamine, methylethylamine, dicyclohexylamine, diphenylamine, and monomethylaniline; tertiary amines, such as trimethylamine, triethylamine, methyldiethylamine, tripropylamine, tributylamine, dimethylaniline, diethylaniline, and ethylbenzylaniline; heterocyclic amines, such as pyridine, 2-aminopyridine, α-picoline, 2,6-lutidine, 2,4-lutidine, collidine, quinoline, pyrimidine, quinazoline, and triazine; and a mixture of pyridine derivatives distillable from coal tar.

The amount of amine employed is 0.2 to 5 moles per mole of hypoxanthine oxide or derivative, but excessive amine may produce undesirable by-products, such as N,N-disubstituted aminochloropurine when trialkylamines are employed, and may reduce the yield.

The reaction of our method is generally carried out at a temperature of 60° to 160° C. The time required for the reaction varies with reaction conditions, such as the amount of reactants, the kind and amount of amine, and the reaction temperature, and may range from about 30 minutes to a few hours. Significant decomposition of 2,6-dichloropurine and of its derivatives was not observed when heating was continued longer than necessary.

The presence of water in the reaction system should be avoided because it reduces the yield.

The compounds prepared by the method of the invention may be isolated from the reaction mixture by conventional methods, such as solvent extraction.

The following examples further illustrate the invention.

EXAMPLE 1

A mixture of 1.064 g. hypoxanthine 1-N-oxide, 2.4 g. N,N-dimethylaniline, and 100 g. (60 ml.) phosphoryl chloride was refluxed for two hours. The excess of phosphoryl chloride was distilled off in a vacuum, the blue syrupy residue was poured into ice water, and the solution was filled up to 100 ml.

Drops of the aqueous solution were spotted on filter paper, developed with an n-propanol-conc. ammonia-water system (20:12:3 parts by volume) and with an n-butanol-acetic acid-water system (4:1:1 parts by volume), and only a single spot other than that of dimethylaniline was detected on both paper chromatograms. The first-mentioned spot was extracted with dilute acid, and the yield of the desired product was determined by measuring the optical density of the extract at a wave length of 277 mμ. 2,6-dichloropurine had been produced in a 66% yield.

The bulk of the aqueous solution was made strongly alkaline with 10 N-sodium hydroxide solution with external water cooling, the liberated N,N-dimethylaniline was extracted with ether, and the water layer was made slightly acidic with conc. hydrochloric acid. The acidic solution was continuously extracted with ether for 12 hours, the ether was distilled off, and 0.85 g. crude 2,6-dichloropurine were obtained as a yellow powder. The crude crystals were dissolved in water, the solution was treated with active charcoal, and 0.79 g. of pure colorless crystals was obtained from the purified solution in a 60% yield.

The crystals were identified by elementary analysis and by their ultra-violet and infrared absorption spectra. They melted at 177° C. with decomposition.

Found: C (percent), 31.77; H (percent), 1.23; N (percent), 29.67; Cl (percent), 37.42. Calculated for $C_5H_2N_4Cl_2$: C (percent), 31.77; H (percent), 1.07; N (percent), 29.64; Cl (percent) 37.52.

EXAMPLE 2

A mixture of 1.030 g. hypoxanthine 1-N-oxide, 1.5 g. triethylamine, and 100 g. phosphoryl chloride was refluxed for three hours. Unreacted phosphoryl chloride was distilled off in a vacuum, the syrupy, pale brown residue was worked up as described in Example 1, and 1.08 g. of yellow crystalline 2,6-dichloropurine were obtained. The yield was 86% by paper chromatography.

The crude crystals were recrystallized from water, and 1.02 g. of colorless pure crystals were obtained, a yield of 80%, M.P. 177° C. (decomposed).

EXAMPLE 3

A mixture of 0.1040 g. hypoxanthine 1-N-oxide, 0.2 g. tri-N-butylamine, and 5.0 g. phosphoryl chloride was refluxed for five hours, and the reaction mixture was further treated as described in Example 1.

2,6-dichloropurine was obtained in a 46% yield as determined by paper chromatography.

EXAMPLE 4

A mixture of 0.1006 g. hypoxanthine 1-N-oxide, 0.23 g. lutidine, and 10 g. phosphoryl chloride was refluxed for four hours, and the reaction mixture was worked up as described in Example 1.

The yield of 2,6-dichloropurine in the reaction mixture was determined by paper chromatography to be 93%.

EXAMPLE 5

A mixture of 0.1012 g. hypoxanthine 1-N-oxide, 0.15 g. diethylamine, and 10 g. phosphoryl chloride was refluxed for four hours, and the yield of 2,6-dichloropurine was found by paper chromatorgraphy to be 40%.

EXAMPLE 6

A mixture of 0.1002 g. hypoxanthine 1-N-oxide, 0.22 g. cyclohexylamine, and 10 g. phosphoryl chloride was refluxed for four hours, and 2,6-dichloropurine was obtained in a yield of 25%, as determined by paper chromatography.

EXAMPLE 7

Hypoxanthine 1-N-oxide and phosphoryl chloride were refluxed in the presence of pyridine, α-picoline and 2,4-lutidine as described in the preceding examples, and 2,6-dichloropurine was produced in yields of 34% (pyridine), 84% (α-picoline), and 80% (2,4-lutidine).

EXAMPLE 8

*Preparation of inosine 1-N-oxide*

5.0 grams adenosine 1-N-oxide dissolved in a mixture of 50 ml. glacial acetic acid and 100 ml. water, a solution of 12.0 g. sodium nitrite in 25 ml. water was added while the temperature of the mixture was held below 20° C., and the resultant solution was kept at room temperature for two days. It was then partly evaporated in a vacuum at a temperature below 20° C., and the pale yellow crystals precipitated were filtered off, washed with a small amount of ethanol, and dried.

The crude crystals were dissolved in water, the aqueous solution was passed through a column packed with a strong acidic ion exchange resin of the hydrogen ion type (Amberlite IR-120), and water was then passed through the column. The combined eluates were evaporated to dryness in a vacuum, the residue was recrystallized from 90% ethanol, and 4.0 g. inosine 1-N-oxide were recovered as colorless pure crystals (80%).

A single spot was detected on a paper chromatogram of the crystals in n-propanol-conc. ammonia-water solvent (Rf: 0.53) and in n-butanol-acetic acid-water solvent (Rf: 0.17). The crystals discolored gradually upon heating above 200° C., and turned black with decomposition at about 210° C.

An elementary analysis of the crystals confirmed the identification.

Found: C (percent), 42.34; H (percent), 4.48; N (percent), 19.66. Calculated for $C_{10}H_{12}N_4O_6$: C (percent), 42.25; H (percent), 4.26; N (percent), 19.71.

Ultra-violet absorption spectra of the crystals showed values of λ max. at 252 and 270 mμ (shoulder) at pH 1, and λ max. 228, 257, and 295 mμ at pH 13.

Absorption bands consistent with the expected structure were found in the infrared absorption spectrum of the crystals.

*Preparation of 2',3',5'-tri-O-acetylinosine 1-N-oxide*

5 grams inosine 1-N-oxide, 100 ml. pyridine, and 50 ml. acetic anhydride were mixed with stirring, and the mixture was kept in an ice-box for 2 days. It was then poured into 200 ml. ice water, the aqueous solution was repeatedly extracted with chloroform, and the combined chloroform fractions were washed with 5% sodium bicarbonate solution and dried with anhydrous sodium sulfate. The chloroform was distilled off in a vacuum, and 6.0 g. crude 2',3',5'-tri-O-acetylinosine 1-N-oxide was obtained as a glassy solid. It was crystallized by adding a small amount of ethanol and recrystallized from ethanol. 4.6 grams of pure crystalline 2',3',5'-tri-O-acetylinosine 1-N-oxide were obtained. The crystals melted at 194–195.5° C.

The Rf value of paper chromatogram of the crystals was 0.70 for an n-butanol-acetic acid-water system (4:1:1 parts by volume). The compound was further identified by elementary analysis.

Found: C (percent), 47.05; H (percent), 4.75; N (percent), 13.47. Calculated for $C_{16}H_{18}O_9N_4$: C (percent), 46.83; H (percent), 4.42; N (percent), 13.66.

*Preparation of 2,6-dichloro-9-(2',3',5'-tri-O-acetyl-β-D-ribofuranosyl) purine*

A mixture of 1.0 g. 2',3',5'-tri-O-acetylinosine 1-N-oxide, 1 ml. 2,6-lutidine, and 23 ml. phosphoryl chloride was refluxed for three hours. The reaction mixture was evaporated to dryness in a vacuum, the residue was dissolved in chloroform, and the chloroform solution was washed with water, with 5% sodium bicarbonate solution, and again with water. The washed chloroform solution was dried with anhydrous sodium sulfate, the chloroform was distilled off under diminished pressure, and a red syrupy residue was obtained.

It was dissolved in hot ethanol, and 0.80 g. pale red crystalline 2,6 - dichloro - 9 - (2',3',5'-tri-O-acetyl-β-D-ribofuranosyl) purine was obtained upon cooling of the alcoholic solution, in a yield of 80%.

The crude material was recrystallized from ethanol with active charcoal, and the colorless crystals obtained melted at 160–161° C.

The Rf value (0.85) of a paper chromatogram in the solvent described above and the ultra-violet and infrared absorption spectra agreed with published data for the compound. The identification was confirmed by elementary analysis.

Found: C (percent), 43.19; H (percent), 3.78; N (percent), 12.28; Cl (percent), 15.7. Calculated for $C_{16}H_{16}N_4O_7Cl_2$: C (percent), 42.96; H (percent), 3.61; N (percent), 12.53; Cl (percent), 15.86.

When equimolar amounts of α-picoline and triethylamine were substituted for 2,6-lutidine, the same compound was obtained in crude crystal yields of 70% (α-picoline), and 60% (triethylamine), respectively.

While the invention has been described with particular reference to specific embodiments, it is to be understood that it is not limited thereto, but is to be construed broadly and restricted solely by the scope of the appended claims.

What we claim is:

1. A method of preparing a purine derivative selected from the group consisting of 2,6-dichloropurine and 2,6- dichloro-9-(2',3',5'-tri-O-acetyl - β - D - ribofuranosyl) purine, which comprises heating the corresponding hypoxanthine derivative selected from the group consisting of hypoxanthine 1 - N - oxide and 2',3',5'-tri-O-acetylinosine 1-N-oxide with phosphoryl chloride in the presence of an amine.

2. A method as set forth in claim 1, wherein said hypoxanthine derivative is heated with said phosphoryl chloride to a temperature of 60° to 160° C.

3. A method as set forth in claim 1, wherein the mole ratio of said phosphoryl chloride to said hypoxanthine derivative is greater than two to one.

4. A method as set forth in claim 1, wherein the mole ratio of said amine to said hypoxanthine derivative is between 0.2 to 1 and 5 to 1.

5. A method as set forth in claim 1, wherein said phosphoryl chloride and said hypoxanthine derivative are heated in a substantially anhydrous medium.

References Cited by the Examiner

UNITED STATES PATENTS

| 2,482,069 | 9/1949 | Ruskin | 260—211.5 |
| 3,074,929 | 1/1963 | Hitchings et al. | 260—211.5 |

ELBERT L. ROBERTS, *Primary Examiner.*

JOHNNIE R. BROWN, *Assistant Examiner.*